US010501348B1

(12) United States Patent
Wilson

(10) Patent No.: US 10,501,348 B1
(45) Date of Patent: Dec. 10, 2019

(54) WATER FLOW TRIGGERING OF CHLORINATION TREATMENT

(71) Applicant: Angel Water, Inc., Barrington, IL (US)

(72) Inventor: Andrew J. Wilson, Barrington, IL (US)

(73) Assignee: Angel Water, Inc., Barrington, IL (US)

( * ) Notice: Subject to any disclaimer, the term of this patent is extended or adjusted under 35 U.S.C. 154(b) by 1054 days.

(21) Appl. No.: 13/829,060

(22) Filed: Mar. 14, 2013

(51) Int. Cl.
*C02F 1/76* (2006.01)

(52) U.S. Cl.
CPC .................................. *C02F 1/76* (2013.01)

(58) Field of Classification Search
CPC ....... C02F 1/4674; F02M 37/11; F02M 37/24; F02M 37/0047; F02M 37/04; F02M 25/0228; F02M 25/025; B01D 29/56; B01D 35/005; B01D 35/26; B01D 35/003; B01D 37/00; B01F 5/0688; B01F 2003/0842; B01F 2215/0086
See application file for complete search history.

(56) References Cited

U.S. PATENT DOCUMENTS

| 4,511,258 | A | 4/1985 | Federighi et al. | |
|---|---|---|---|---|
| 4,936,689 | A | 6/1990 | Federighi et al. | |
| 5,637,230 | A * | 6/1997 | Billings | B01F 1/0038 |
| | | | | 137/888 |
| 6,346,198 | B1 * | 2/2002 | Watson | B01F 3/0446 |
| | | | | 210/198.1 |
| 8,877,067 | B2 * | 11/2014 | Sichel | C02F 1/76 |
| | | | | 210/199 |
| 2004/0211731 | A1 * | 10/2004 | Ferguson | A61L 2/18 |
| | | | | 210/739 |
| 2005/0084411 | A1 * | 4/2005 | Childers, II | C02F 1/76 |
| | | | | 422/3 |
| 2005/0218054 | A1 * | 10/2005 | Sakata | A61L 2/18 |
| | | | | 210/192 |
| 2010/0018990 | A1 * | 1/2010 | Eklund | A47L 11/03 |
| | | | | 222/1 |
| 2011/0047690 | A1 * | 3/2011 | Hui | E04H 4/12 |
| | | | | 4/507 |
| 2011/0094949 | A1 * | 4/2011 | Just | C02F 1/688 |
| | | | | 210/85 |
| 2011/0139701 | A1 | 6/2011 | Pearks et al. | |

(Continued)

OTHER PUBLICATIONS

"Activated Carbon & Specialty Products," CalgonCarbon, 2013 Calgon Carbon Corporation.

*Primary Examiner* — Bobby Ramdhanie
*Assistant Examiner* — Donovan Bui-Huynh
(74) *Attorney, Agent, or Firm* — McDonnell Boehnen Hulbert & Berghoff LLP

(57) ABSTRACT

As an example embodiment, a system may detect water flow in a well water system and may responsively trigger a pump to inject a chlorinating substance into untreated water from the well. Further, the system may include a contact reservoir that allows the water and the chlorinating substance to combine. In this way, the chlorinating substance is drawn only when needed, but is given the opportunity to achieve time in solution with the untreated water. As a result, bacteria in untreated water may be dispatched, while other organic substances in the untreated water are given the opportunity to settle to the bottom of the contact reservoir. A static mixer may be used to mix the chlorinating substance and the untreated water prior to entering the contact reservoir and/or while in the contact reservoir.

19 Claims, 3 Drawing Sheets

(56) References Cited

U.S. PATENT DOCUMENTS

2012/0039792 A1 2/2012 Duta
2012/0285897 A1* 11/2012 Fike .......................... C02F 9/00
   210/743

* cited by examiner

WATER FLOW TRIGGERING OF CHLORINATION TREATMENT

BACKGROUND

Many residential and smaller commercial water supply systems draw water from a well. The well may be dug or drilled to access groundwater in underground aquifers. Since well water may be used for drinking, contamination is a concern. Thus, it is desirable to be able to eliminate, reduce, and/or neutralize, bacteria and other potentially harmful organic and/or non-organic substances that may exist in raw, untreated well water. However, doing so efficiently can be challenging.

SUMMARY

The embodiments herein disclose a system that may detect water flow in a well water system and responsively trigger a pump to inject a chlorinating substance into untreated water from the well. Further, the system may include a contact reservoir that allows the water and the chlorinating substance to combine. In this way, the chlorinating substance is drawn only when needed, but is given the opportunity to achieve time in solution with the untreated water. As a result, bacteria in untreated water may be dispatched, while other organic substances in the untreated water are given the opportunity to settle to the bottom of the contact reservoir. In some embodiments, a static mixer may be used to mix the chlorinating substance and the untreated water prior to entering the contact reservoir and/or while in the contact reservoir.

The system may further include a de-chlorinator that receives chlorinated water from the contact reservoir, and removes at least some of the chlorinating substance from the water. The de-chlorinator may provide the resulting treated water to a water distribution system in a residence or small business. The treated water may be suitable for drinking, cooking, washing, and/or other household uses. In some cases, the water flow may be detected by a flow valve that is coupled to the de-chlorinator.

Accordingly, in an example embodiment, a pump may be configured to inject a chlorinating substance into water when triggered. A contact reservoir may be configured to receive the water and the chlorinating substance. Further, a flow valve may be configured to sense a flow of the water, and configured to responsively trigger the pump to inject the chlorinating substance into the water.

In another example embodiment, a flow valve may sense a flow of water. In response to sensing the flow of water, a pump may be triggered, perhaps by the flow valve, to inject a chlorinating substance into the flow of water. A contact reservoir may receive the water and the chlorinating substance.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
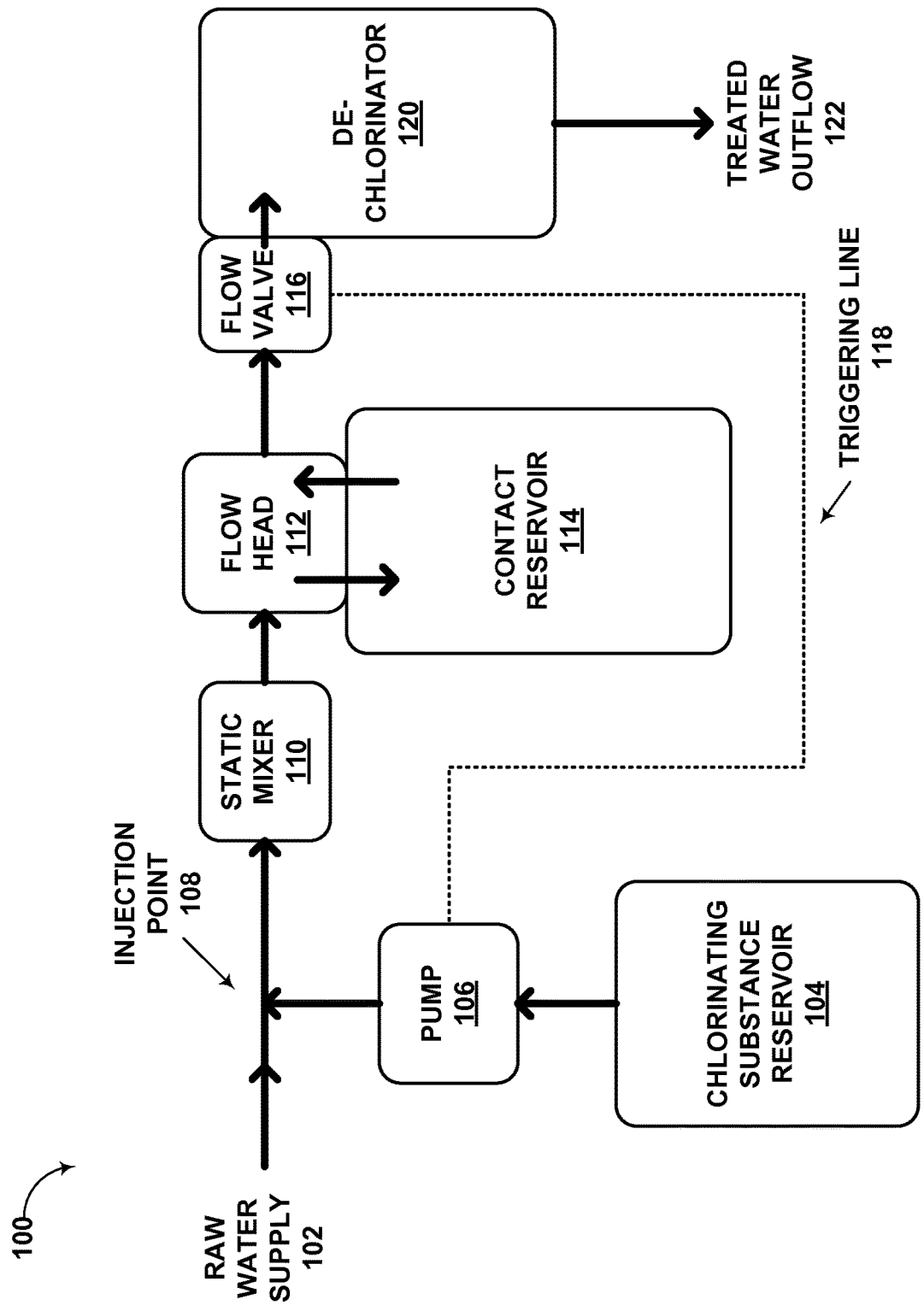
FIG. 1 depicts a water treatment system, in accordance with an example embodiment.

FIG. 1 depicts a system 100, in accordance with an example embodiment. FIG. 1 includes a number of piping units, depicted in broad, solid, lines with arrows indicating the direction of water flow. Thus, generally speaking, water may flow from raw water supply 102 to treated water outflow 122. The piping units may be pipe, or some other conduit capable of moving liquid from one point to another. For example, the piping units may be copper pipe, polyvinyl chloride (PVC) pipe, hoses, etc.

In FIG. 1, untreated water is received from raw water supply 102. Raw water supply 102 may be a well that provides ground water from an aquifer, or some other source of untreated water. For instance, raw water supply 102 may be a reservoir of untreated water, or a unit of piping that provides untreated water to system 100.

Chlorinating substance reservoir 104 may be a tank, an accumulator, or some other medium that is configured to contain a chlorinating substance. The chlorinating substance may be, for instance, sodium hypochlorite, calcium hypochlorite, hydrogen peroxide, or some other type of bleach or oxidizing agent.

Chlorinating substance reservoir 104 may provide the chlorinating substance to pump 106. Pump 106 may be any type of pump, such as a peristaltic pump, and may be configured to be either in an activated state or a deactivated state. When in the activated state, pump 106 may move the chlorinating substance from chlorinating substance reservoir 104 to injection point 108. When in the deactivated state, pump 106 may prevent or impede the movement of the chlorinating substance from chlorinating substance reservoir 104 to injection point 108. Pump 106 may be triggered to switch from the deactivated state to the activated state by any electrical mechanism, mechanical mechanism, optical mechanism, or via some other type of mechanism. Particularly, pump 106 may be triggered between the states by triggering line 118.

Injection point 108 may be a junction between the piping unit from raw water supply 102 and the piping unit from pump 106. Thus, when pump 106 is in the activated state, injection point may receive water from raw water supply 102 and the chlorinating substance from pump 106. However, when pump 106 is in the deactivated state, injection point 108 might only receive water from raw water supply 102. Regardless, injection point 108 may provide the received matter to static mixer 110. (In the following, it is assumed that pump 106 is in the activated state, and thereby providing the chlorinating substance into other parts of system 100, unless context indicates otherwise.)

Static mixer 110 may receive the water and the chlorinating substance, and mix the two together. To do so, static mixer 110 may create turbulence that combines the water and the chlorinating substance. In some embodiments, the static mixer may be combined with, mounted on, or otherwise integrated with contact reservoir 114. Static mixer 110 may provide the combined water and chlorinating substance (hereafter, "the solution") to flow head 112.

Flow head 112 may receive the solution and provide it into contact reservoir 114. In turn, contact reservoir 114 may allow for an extent of the solution to blend, thereby dispatching at least some of any bacteria that may be introduced by raw water supply 102. The chlorinating substance in the solution may further serve to neutralize organic substances from raw water supply 102. These neutralized organic substances may settle to the bottom and/or sides of contact reservoir 114, where they may be conveniently removed. In some embodiments, flow head 112 may be referred to as a reverse flow head.

Contact reservoir 114 may be a tank, an accumulator, or some other medium that is configured to contain the solution. Further, contact reservoir 114 may include a spin-down function that acts as or similarly to that of a centrifuge. Thus, this function may serve to efficiently separate the neutralized organic substances from the solution.

In some embodiments not shown in FIG. 1, static mixer 110 may be located inside of, or otherwise combined with, contact reservoir 114. In these scenarios, flow head 112 may push untreated water and the chlorinating substance through static mixer 110 into contact reservoir 114.

Regardless, flow head 112 may also receive the solution from contact reservoir 114, and provide the received solution to flow valve 116. In normal operation, the received solution will have had some, most, or all of its bacteria dispatched, and some, most, or all of the other organic substances removed.

Flow valve 116 may receive the solution from flow head 112 and provide the solution to de-chlorinator 120. Additionally, flow valve 116 may be configured to be able to detect when water is flowing through system 100. For instance, in normal residential use, raw water supply 102 provides pressurized water throughout system 100, and to the residence's plumbing system via treated water outflow 122. Therefore, when all faucets and other devices that draw water through system 100 are turned off, there may be no flow through system 100. Consequently, in this case, there may also be no flow through flow valve 116. However, when one of these faucets or other devices (e.g., a sink faucet, a shower faucet, a dishwasher, a washing machine, etc.) is turned on, then water will flow through system 100, including flow valve 116.

Flow valve 116 may be configured detect changes in water pressure or to detect water flow in some other way. Regardless, when flow valve 116 detects water flow, flow valve 116 may use triggering line 118 to trigger pump 106 to switch from the deactivated state to the activated state. Similarly, when flow valve 116 detects that the water flow has stopped, flow valve 116 may use triggering line 118 to trigger pump 106 to switch from the activated state to the deactivated state.

Triggering line 118 may include electrical wire, optical fiber, network cable, or some other medium that transports one or more types of signals between flow valve 116 and pump 106. Alternatively, triggering line 118 may be mechanical, and may serve to mechanically switch pump 106 between states.

De-chlorinator 120 may receive the solution from flow valve 116 and separate the chlorinating substance from the water. For example, de-chlorinator 120 may be a charcoal filter, or some other mechanism. De-chlorinator 120 may provide this treated water to treated water outflow 112.

Treated water outflow 122 may represent an indoor or outdoor plumbing system. For instance, as noted above, treated water outflow 122 may provide treated water to faucets and other devices in a residence, small business, etc.

It should be understood that system 100 may be rearranged in various ways. For instance, some components may be placed in different locations relative to other components, and/or may be connected in different arrangements. Further, the functionality of some components may be combined with that of other components.

As an example, flow valve 116 may be located between static mixer 110 and flow head 112, between injection point 108 and static mixer 110, after de-chlorinator 120, or closer to raw water supply 102. Alternatively, flow valve 116 may be coupled to de-chlorinator 120. In some embodiments, static mixer 110 may be integrated with contact reservoir 114 and/or pump 106 may be integrated with contact reservoir 114.

Figure 3:
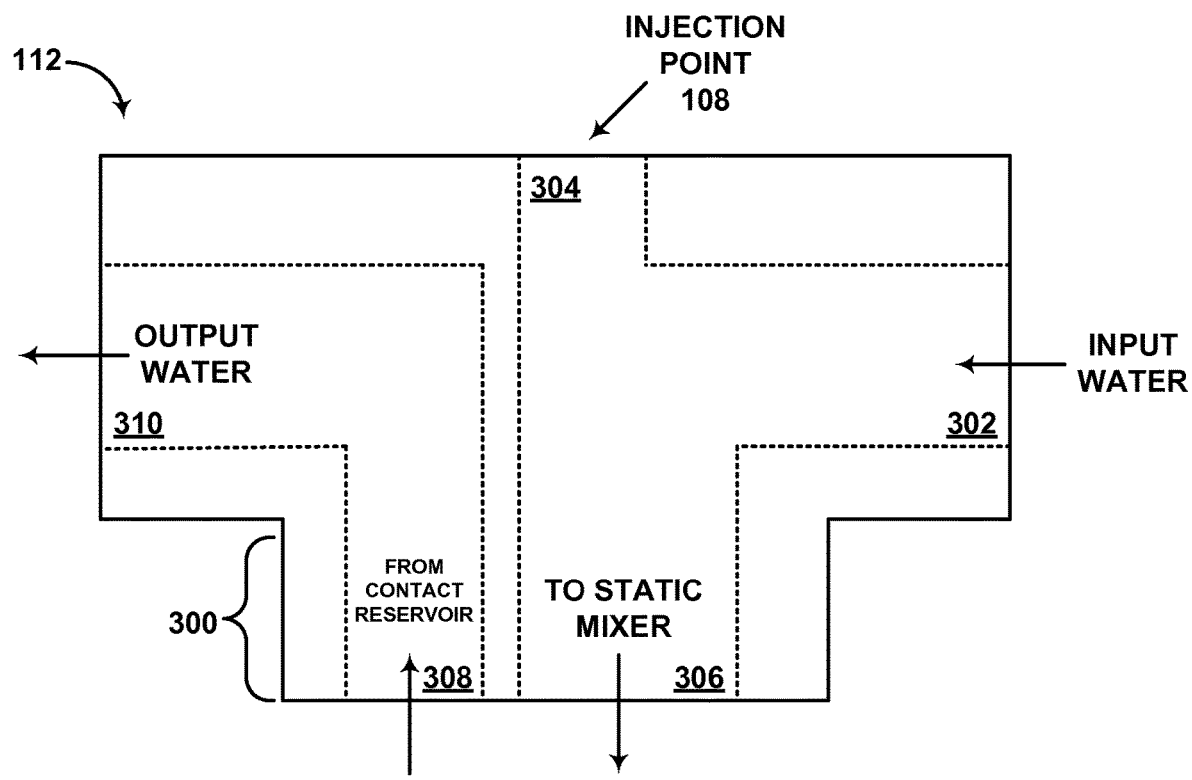
FIG. 3 depicts a flow head, in accordance with an example embodiment.

Alternatively, and as described further in the context of FIG. 3, the top of flow head 112 may include or be coupled to injection point 108, and the bottom of flow head 112 may be coupled to static mixer 110.

Figure 2:
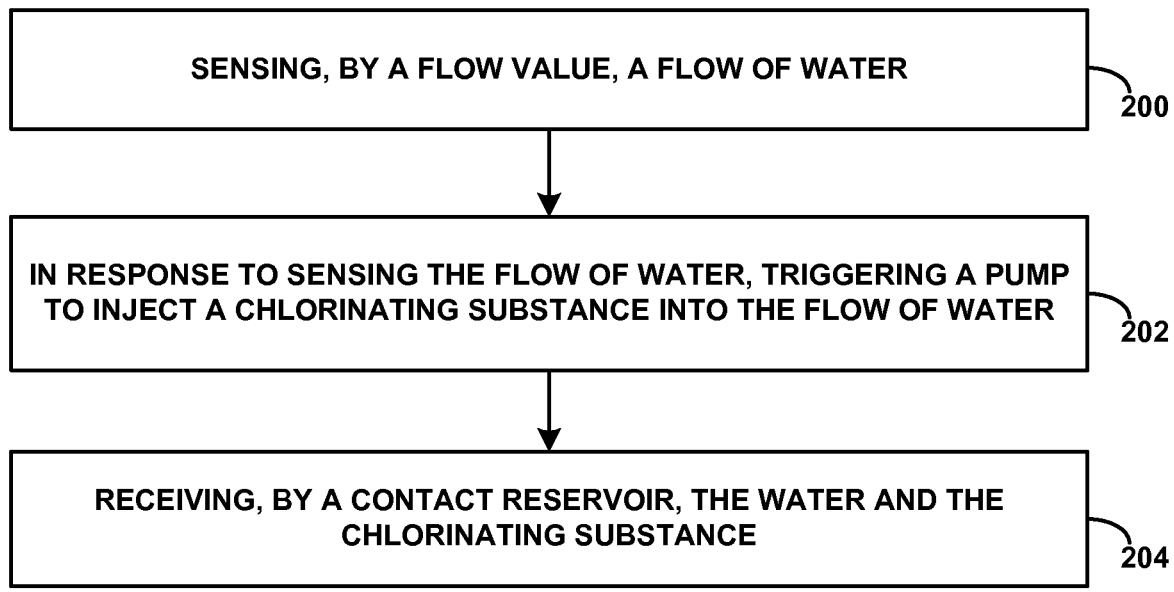
FIG. 2 is a flow chart, in accordance with an example embodiment.

FIG. 2 depicts a method according to an example embodiment. At block 200, a flow of water may be sensed by a flow valve. At block 202, in response to sensing the flow of water, the flow valve may trigger a pump to inject a chlorinating substance into the flow of water. At step 204, a contact reservoir may receive the water and the chlorinating substance.

In some embodiments, the chlorinated flow of water may be received from the contact reservoir, and the chlorinated water may be de-chlorinated. De-chlorinating the chlorinated water may occur in a de-chlorinator, and the flow valve may be coupled to the de-chlorinator. Further, the water may be drawn from an untreated, or raw, water supply, and the de-chlorinator may provide treated water.

Alternatively or additionally, the pump may be configured to draw the chlorinating substance from a chlorinating substance reservoir. In some cases, a static mixer may be configured to combine the water and the injected chlorinating substance prior to, or in conjunction with, the water entering the contact reservoir. The static mixer may be integrated with the contact reservoir, and the pump may also be integrated with the contact reservoir.

The pump may be connected by a first unit of piping to the contact reservoir, and the contact reservoir may be connected by a second unit of piping to the flow valve. A flow head may be coupled to the contact reservoir. The flow head may include an input water port and an output water port. The input water port may be coupled to the first unit of piping, and the output water port may be coupled to the second unit of piping.

This system and process of injecting the solution into a water supply provides significantly safer and cleaner water than many other filter system technologies. Other technologies may focus on the elimination of bacteria from the filter material rather than from the water supply. As a result, other technologies may allow bacteria-riddled water to exist within the plumbing distribution system, where the bacteria have an opportunity to grow. The disclosed system and process kills bacteria in the water supply, while eliminating nuisance odors and oxidizing particles from the water. Then, excess amounts of the chlorinating substance are removed, which provides improved quality water. The process of killing bacteria is accurately achieved using a flow valve. The flow valve provides a precise dosing of the chlorinating substance to water while water is being used.

FIG. 3 depicts a side view of flow head 112 in accordance with an example embodiment. In some arrangements, the bottom section 300 of flow head 112 may be coupled with static mixer 110. This coupling may be based on a slideable attachment, a screwable attachment, a welded attachment, or some other form of attachment. The top of flow head 112 may serve as injection point 108, or may be coupled to injection point 108.

Flow head 112 may receive untreated input water via right-hand port 302, and a chlorinating substance via top port 304 (which may be integrated with or coupled to injection point 108). This water and chlorinating substance may be pushed down and out of flow head 112 via right-hand, bottom port 306 into static mixer 110.

Via the left-hand, bottom port 308, flow head 112 may receive a solution from contact reservoir 114. The solution may include a mixture of the water and the chlorinating substance. The solution may have passed through a diffuser in contact reservoir 114. The solution may be pushed out of flow head 112 via output port 310.

The above detailed description describes various features and functions of the disclosed systems, devices, and methods with reference to the accompanying figures. In the figures, similar symbols typically identify similar components, unless context indicates otherwise. The illustrative embodiments described in the detailed description, figures, and claims are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A system comprising:
   a unit of piping configured to connect to a source of untreated water, wherein the untreated water is pressurized;
   a pump, in fluid communication with the unit of piping, configured to inject a chlorinating substance into the unit of piping when remotely triggered by a flow valve that is downstream from the pump, the flow valve electronically coupled to the pump by a triggering line;
   a contact reservoir, in downstream fluid communication with the unit of piping and the pump, configured to receive the untreated water and the chlorinating substance, and to combine the untreated water and chlorinating substance to produce chlorinated water therefrom; and
   the flow valve, in downstream fluid communication with the contact reservoir and electronically coupled to the pump, configured to:
   receive a flow of water from the contact reservoir;
   sense the flow through the flow valve; and
   in response to sensing the flow, generate and transmit to the pump an electronic control signal by way of the triggering line that remotely triggers the pump to inject the chlorinating substance into the untreated water, which causes the flow of water through the flow valve to become chlorinated.

2. The system of claim 1, further comprising:
   a de-chlorinator configured to receive the chlorinated water from the contact reservoir, and configured to de-chlorinate the chlorinated water.

3. The system of claim 2, wherein the flow valve is coupled to the de-chlorinator, and wherein the de-chlorinator is in fluid communication with the contact reservoir by way of the flow valve.

4. The system of claim 2, wherein the untreated water is drawn from the source of untreated water when the chlorinated water is flowing, and wherein the de-chlorinator provides treated water.

5. The system of claim 1, wherein the pump is in fluid communication with a chlorinating substance reservoir and wherein the pump is further configured to draw the chlorinating substance from the chlorinating substance reservoir when remotely triggered.

6. The system of claim 1, further comprising:
   a static mixer integrated with the contact reservoir, configured to combine the untreated water and the injected chlorinating substance.

7. The system of claim 6, wherein the pump is also integrated with the contact reservoir.

8. The system of claim 1, wherein the unit of piping is a first unit of piping, wherein the pump is connected by a second unit of piping to the first unit of piping, wherein the pump is in fluid communication with the contact reservoir by way of the second unit of piping, wherein the contact reservoir is connected by a third unit of piping to the flow valve, and wherein the flow valve is in fluid communication with the contact reservoir by way of the third unit of piping.

9. The system of claim 8, further comprising:
   a flow head coupled to the contact reservoir, wherein the flow head comprises an input port and an output port, wherein the input port is coupled to the first unit of piping, and wherein the output port is coupled to the third unit of piping.

10. A method comprising:
    sensing, by a flow valve, a flow of water, through the flow valve, from a contact reservoir, wherein the flow valve is in downstream fluid communication with the contact reservoir;
    in response to sensing the flow of the water through the flow valve, generating and transmitting, by the flow valve, an electronic control signal to a pump, the signal remotely triggering the pump to inject, at a unit of piping, a chlorinating substance into a flow of untreated water to the contact reservoir, wherein the flow valve is electronically coupled to the pump, wherein the flow of untreated water to the contact reservoir is by way of the unit of piping in fluid communication with the contact reservoir and the pump, and wherein the unit of piping is configured to connect to a pressurized source of the untreated water;
    receiving, by the contact reservoir, the flow of untreated water and the chlorinating substance; and
    combining, by the contact reservoir, the untreated water and chlorinating substance to produce the chlorinated water therefrom, which causes the flow of water through the flow valve to become chlorinated.

11. The method of claim 10, further comprising:
    receiving, by a de-chlorinator, the flow of the chlorinated water from the contact reservoir; and
    de-chlorinating, by the de-chlorinator, the chlorinated water.

12. The method of claim 11, wherein the flow valve is coupled to the de-chlorinator, and wherein the de-chlorinator is in fluid communication with the contact reservoir by way of the flow valve.

13. The method of claim 10, wherein the pump is in fluid communication with a chlorinating substance reservoir, and wherein the pump is configured to draw the chlorinating substance from the chlorinating substance reservoir when remotely triggered.

14. The method of claim 10, wherein the contact reservoir includes a static mixer that is configured to combine the untreated water and the injected chlorinating sub stance.

15. The method of claim 10, wherein the unit of piping is a first unit of piping, wherein the pump is connected by a second unit of piping to the first unit of piping, wherein the pump is in fluid communication with the contact reservoir by way of the second unit of piping, wherein the contact reservoir is connected by a third unit of piping to the flow valve, and wherein the flow valve is in fluid communication with the contact reservoir by way of the third unit of piping.

16. The method of claim 15, wherein a flow head is coupled to the contact reservoir, wherein the flow head comprises an input port and an output port, wherein the input port is coupled to the first unit of piping, and wherein the output port is coupled to the third unit of piping.

17. A system comprising:
- a pump connected to a proximate end of a first unit of piping and configured to inject a chlorinating substance into the first unit of piping when remotely triggered by a flow valve that is downstream from the pump, the flow valve electronically coupled to the pump by a triggering line;
- a contact reservoir connected to a distal end of the first unit of piping and configured to receive untreated water and the chlorinating substance by way of the first unit of piping, and to combine the untreated water and chlorinating substance to produce chlorinated water therefrom, wherein the untreated water is pressurized;
- a de-chlorinator connected to the contact reservoir by a second unit of piping and configured to receive chlorinated water from the contact reservoir by way of the second unit of piping; and
- the flow valve connected in-line with the second unit of piping between the contact reservoir and the de-chlorinator, wherein the flow valve is configured to:
  - receive a flow of water from the contact reservoir;
  - sense the flow of water out of the contact reservoir and into the de-chlorinator by way of the second unit of piping by sensing a flow of the water through the flow valve; and
  - in response to sensing the flow of water through the flow valve, generate and transmit to the pump an electronic control signal that remotely triggers the pump to inject the chlorinating substance into the first unit of piping, wherein the generated electronic control signal is provided to the pump by way of the triggering line, which causes the flow of water through the flow valve to become chlorinated.

18. The system of claim 17, wherein the flow valve is configured to sense the flow by detecting a change in pressure of the chlorinated water at the flow valve.

19. The system of claim 1, wherein the flow valve is configured to sense the flow by detecting a change in pressure of the chlorinated water at the flow valve.

* * * * *